Patented Oct. 20, 1953

2,656,344

UNITED STATES PATENT OFFICE 2,656,344

PREPARATION OF ESTERS OF OXODEHYDROABIETIC ACID

Paul F. Ritchie, Wilmington, Del., assignor to Hercules Powder Company, Wilmington, Del., a corporation of Delaware No Drawing. Application May 8, 1951,
Serial No. 225,282

15 Claims. (Cl. 260—99)

This invention relates to a new process for preparing esters of 9-oxodehydroabietic acid and, more particularly, to the process of preparing these esters by the oxidation of dehydroabietic acid esters and subsequent reduction of the hydroperoxide so obtained to the keto derivative.

In accordance with this invention it has been found that esters of 9-oxodehydroabietic acid may be prepared by oxidizing an ester of dehydroabietic acid in liquid phase with an oxygen-containing gas to produce an oxidate containing a hydroperoxydehydroabietate and reducing said hydroperoxydehydroabietate by contacting it with a metallic reducing agent. When an ester of dehydroabietic acid is oxidized in liquid phase with oxygen, the chief oxidation product is the 9-hydroperoxydehydroabietate. This hydroperoxide may be isolated from the oxidate and then be reduced by treatment with a metallic reducing agent, or the oxidate may be treated with the metallic reducing agent without separating the hydroperoxide, after which the 9-oxodehydroabietate may be isolated from the reaction mixture. While secondary hydroperoxides may be converted to the ketone by thermal decomposition, in the case of the 9-hydroperoxydehydroabietates, this thermal decomposition does not proceed smoothly or efficiently. However, by contacting the esters of 9-hydroperoxydehydroabietic acid or an oxidate containing such a hydroperoxide with a metallic reducing agent, the ketone is easily obtained in high yields. Thus, the process of this invention makes it possible to produce an ester of 9-oxodehydroabietic acid by a commercially adaptable method.

The following examples will illustrate the process of preparing esters of 9-oxodehydroabietic acid in accordance with this invention. Unless otherwise specified all quantities are on the basis of parts by weight.

Example 1

One hundred fifty parts of methyl dehydroabietate was mixed with 2.785 parts of benzoyl peroxide and heated to 77° C. Oxygen was then passed into the molten reaction mixture which was held at 77° C. throughout the oxidation. After 29 hours, 0.86 mole of oxygen per mole of ester had been absorbed. The oxidate so obtained contained 51.2% hydroperoxide.

Seventy-two parts of the above oxidate was dissolved in 1000 parts of methanol. To this solution, which was vigorously agitated, and at room temperature, was slowly added a solution containing 72 parts of ferrous sulfate dissolved in 1000 parts of a 1:1 aqueous methanol solution. The reaction mixture was poured into 10 volumes of water and the product extracted with ether. After washing the ether extract with water and drying it over anhydrous sodium sulfate, the ether was removed by distillation. The product so obtained was then dissolved in 500 parts of a 3:1 hexane-benzene solution. This solution was poured on an alumina column and the column was eluted with hexane containing 25% benzene, whereby the unreacted methyl dehydroabietate was separated. Elution of the column with hexane containing 50% benzene and then with methylene chloride removed a colorless material from the column which, on removal of the solvent, crystallized. The crystalline material so obtained was recrystallized from aqueous methanol, whereby white crystals of methyl 9-oxodehydroabietate having a melting point of 68°–69° C. were obtained. The carbon and hydrogen content of this product was in agreement with that calculated for methyl 9-oxodehydroabietate. Furthermore, a 2,4-dinitrophenylhydrazone prepared from it and having a constant melting point of 184.5°–185.5° C. was analyzed for nitrogen and found to be in agreement with the calculated value.

Example 2

Seventy-five parts of a methyl dehydroabietate oxidate, obtained by oxidizing methyl dehydroabietate in liquid phase with oxygen in the presence of benzoyl peroxide and containing 50.1% hydroperoxide, was dissolved in 500 parts of a 10% aqueous methanol solution and subjected to countercurrent extraction with an equal volume of hexane in order to separate the methyl 9-hydroperoxydehydroabietate. The extraction was carried out in five separators through a series of twenty-five equilibrations. The fraction of the oxidate which was recovered from the hexane amounted to 36% and contained 3.6% hydroperoxide. The fraction recovered from the 10% aqueous methanol solution amounted to 67% of the total oxidate and contained 79.5% hydroperoxides. The latter fraction was then dissolved in 500 parts of a 20% aqueous methanol solution and subjected to countercurrent extraction with an equal volume of isooctane, again through a series of twenty-five equilibrations. The fraction recovered from the aqueous methanol solution amounted to 47% of the foregoing peroxide-rich fraction and contained 87.4% hydroperoxides. The fraction recovered from the isooctane solution amounted to 20% of the previous hydroperoxide-rich fraction and contained 53.3% hydroperoxide. On dissolving this fraction in methanol and cooling to 0°–20° C. a yield of 21%, based on the hydroperoxide content of the oxidized ester, of methyl 9-hydroperoxydehydroabietate crystallized out. It had a melting point of 132.5°–133.5° C.

Ten parts of this crystalline methyl 9-hydroperoxydehydroabietate was dissolved in 500 parts of methanol. The solution was agitated and a solution of 18 parts of ferrous sulfate dissolved in 400 parts of a 1:1 aqueous methanol mixture was slowly added at room temperature. Agitation was continued at room temperature for one-half hour, after which the reaction mixture was heated at 50° C. and agitated at that temperature for 1.5 hours. The reaction mixture was then poured into 10 volumes of water and the product extracted with ether. The ethereal extract was washed with water and dried with anhydrous sodium sulfate. The ether was removed by distillation and the residue containing 94% methyl 9-oxodehydroabietate, as indicated by its ultraviolet absorption spectrum, was distilled under reduced pressure. The fraction which distilled between 160°–170° C. at 0.02 mm. pressure amounted to 8.9 parts and was crystallized from hexane. It was then recrystallized from aqueous methanol, whereby white crystals of methyl 9-oxodehydroabietate melting at 68°–69° C. were obtained.

*Example 3*

Fifteen parts of a crystalline methyl 9-hydroperoxydehydroabietate was dissolved in 500 parts of methanol. The solution was agitated and with the temperature held at 10° C., 7 parts of ferrous sulfate dissolved in 1000 parts of a 25% aqueous methanol solution was added. The reaction mixture was allowed to come to room temperature and was then poured into 10 volumes of water and the product extracted with ether and distilled as in the foregoing example. The product obtained amounted to 15 parts. It was dissolved in aqueous methanol and crystallized, whereby the white crystalline methyl 9-oxodehydroabietate melting at 68°–69° C. was obtained.

*Example 4*

Fifteen parts of ethyl dehydroabietate was oxidized with molecular oxygen in the presence of 0.75 part of benzoyl peroxide at 80° C. After 6.25 hours, the ester had absorbed 37.7 mole per cent of oxygen and the product was found on analysis to contain 40.3% of hydroperoxide.

One and one-half parts of this oxidate was dissolved in 50 parts of methanol. A solution of 2.0 parts of ferrous sulfate in a mixture of 20 parts of water and 30 parts of methanol was added to the agitated oxidate solution during a period of 1.5 hours. After heating at 50° C. for 1.5 hours, the reaction mixture was poured into several volumes of water and the organic material was extracted with ether. The ethereal solution was dried and then evaporated to dryness. The product so obtained was shown by spectrographic analysis to contain 32–33% ethyl 9-oxodehydroabietate.

Any ester of 9-oxodehydroabietic acid may be prepared in accordance with this invention by oxidizing the corresponding ester of dehydroabietic acid in liquid phase with oxygen and then reducing the hydroperoxide so obtained to the ketone. The esters of dehydroabietic acid which are so oxidized may be prepared from dehydroabietic acid my any of the methods commonly employed in the production of carboxylic acid esters as, for example, esterification of the acid with an alcohol under pressure or of the acid chloride with an alcohol or by heating an alkali metal salt of the acid with an alkyl halide. The dehydroabietic acid which is esterified is readily obtained from a dehydrogenated or disproportionated rosin by solvent extraction. Instead of using the pure ester, an ester of commercial dehydrogenated rosin may be used or an ester of rosin may be dehydrogenated and used.

While the foregoing examples have shown the oxidation and subsequent reduction of the oxidized product in accordance with this invention as applied to methyl and ethyl dehydroabietate, the process is equally applicable to any other alkyl, hydroxyalkyl, aryl, or aralkyl dehydroabietate as, for example, propyl, butyl, hydroxyethyl, glycerol, benzyl, etc., dehydroabietates.

The oxidation of the dehydroabietic acid esters to produce the 9-hydroperoxydehydroabietates is carried out by passing an oxygen-containing gas through the ester in the liquid state, either molten or dissolved in an inert solvent. Any gas containing free oxygen may be used for carrying out the oxidation as, for example, molecular oxygen or air. The temperature at which the oxidation is carried out will depend upon the reaction conditions. For example, if it is carried out in the absence of a solvent, the temperature must be at least that of the melting point of the ester being oxidized as, for example, above about 62° C. in the case of methyl dehydroabietate, etc. If a solution of the ester is used for carrying out the oxidation reaction as, for example, in tertiary butylbenzene, lower temperatures may be used for the oxidation. The maximum temperature at which the oxidation is carried out is that at which the hydroperoxide will decompose. In general, the oxidation is carried out at temperatures between about 60° C. and 130° C. and preferably between about 65° C. to about 100° C., a particularly advantageous range being between about 70° C. and 90° C. The oxidation is usually carried out at about atmospheric pressure. However, if desired, super-atmospheric pressures may be used.

The oxidation of the dehydroabietic acid esters is preferably carried out in the presence of a free radical oxidation initiator; i. e., a material which undergoes thermal decomposition to form free radicals under the reaction conditions. Of particular value are the peroxidic free radical oxidation initiators such as organic peroxides and organic hydroperoxides which form free radicals under the reaction conditions. Exemplary of the organic peroxides which may be used to initiate the oxidation reaction are the acyl peroxides such as acetyl peroxide, benzoyl peroxide, etc., alkyl peroxides such as tert-butyl peroxide, methyl ethyl peroxide, etc. Exemplary of the organic hydroperoxides which may be used to initiate the oxidation reaction are the alkyl hydroperoxides such as tert-butyl hydroperoxide, and alkyl aryl and alkyl cycloalkyl hydroperoxides such as diphenylmethyl hydroperoxide, $\alpha,\alpha$-dimethylbenzyl hydroperoxide, $\alpha,\alpha$-dimethyl-p-isopropylbenzene hydroperoxide, methylcyclohexyl hydroperoxide, tetralin hydroperoxide, naphthene hydroperoxides, etc. When using the free radical oxidation initiators, an amount of from about 0.1% to about 20%, and preferably about 0.3% to about 10%, is added to the dehydroabietic acid ester being oxidized.

The oxidate so produced and containing the ester of 9-hydroperoxydehydroabietic acid may be subjected to the reduction reaction in accordance with this invention or the 9-hydroperoxydehydroabietate may be separated from the oxidate and then reduced. If the pure hydroperoxide is desired, it may be obtained from the crude oxidation product, referred to as the oxidate, by countercurrent solvent extraction or any other extractive procedure. Examples of solvent combinations which may be used for the countercurrent extraction are aqueous methanol, ethanol, dioxane, etc., solutions with aliphatic or alicyclic hydrocarbon solvents such as hexane, heptane, isooctane, cyclohexane, etc.

The reduction of the 9-hydroperoxydehydroabietic acid ester is carried out by contacting the ester, preferably dissolved in an inert solvent, with a metallic reducing agent. Any metallic compound containing a metallic atom which is capable of acting as a reducing agent; i. e., which exists in more than one valence state and is in one of its lower valence states and is capable of being oxidized to one of its higher valence states, may be employed in the process of this invention. Such compounds are designated herein and in the claims appended herewith as "metallic reducing agents." Exemplary of the metallic reducing agents which may be used are the salts such as the sulfates, nitrates, chlorides, naphthenates, acetates, etc., of iron, cobalt, nickel, manganese, chromium, tin, lead, mercury, copper, etc., wherein the metallic ion is in one of its lower oxidation states as, for example, ferrous, cobaltous, nickelous, manganous, stannous, cuprous, etc., salts. Complexes of these metallic ions may likewise be used. The metallic reducing agent is preferably one which is water-soluble.

The process of this invention is preferably practiced by the gradual addition with agitation of a solution of the metallic reducing agent to a solution of the 9-hydroperoxydehydroabietate or oxidate containing this hydroperoxide. Any inert solvent may be used for carrying out this reduction reaction but it is preferably a polar solvent; i. e., in which ionization is possible. For example, the 9-hydroperoxydehydroabietate or oxidate containing this hydroperoxide may be dissolved in methanol and the metallic reducing agent then added as a solution in aqueous methanol. Any solvent in which both the hydroperoxide and metallic reducing agent are soluble may be used as, for example, aqueous ethanol, acetone, dioxane, propanol, isopropanol, etc. While the preferred method is to carry out the reaction in a homogeneous system, it is possible to use a heterogeneous system, for example, by contacting a solution of the hydroperoxide in a solvent such as ether, benzene, toluene, etc., with an aqueous solution of the metal salt. The amount of solvent used may be varied over a wide range but should be sufficient to insure that the reaction mixture is homogeneous. Usually, the hydroperoxide is dissolved in an amount of the solvent to obtain a solution of from about 1% to about 10% concentration. The amount of solvent in which the metallic reducing agent is dissolved is likewise variable but need be no more than the amount necessary to dissolve the agent. As pointed out above, an aqueous methanol or aqueous ethanol solution is particularly effective as a solvent for the metallic reducing agent and usually is one in which the water content is from about 25% to about 60%.

These 9-hydroperoxydehydroabietates are secondary hydroperoxides but, as pointed out above, they do not readily undergo thermal decomposition. However, when contacted with a metallic reducing agent, the ketone is produced easily and in high yields. Just how the metallic reducing agent functions to decompose these hydroperoxides to the ketone is not known. If a sufficient quantity of the metallic reducing agent is added to provide one electron for each hydroperoxy radical, it may be assumed that a straight oxidation-reduction reaction has occurred. However, if it were merely a case of the metallic ion acting as a reducing agent, then any reducing agent should be operable, but this is not the case, for when the 9-hydroperoxydehydroabietates are contacted with a nonmetallic reducing agent, the hydroperoxy radical is reduced to an alcohol group to yield a 9-hydroxydehydroabietate. Furthermore, less than the amount of the metallic reducing agent necessary to furnish one electron per hydroperoxy group may be used and still obtain the ketone. Thus, the reaction appears to be a reduction reaction in which the metallic ion functions as a catalyst for the reduction reaction rather than as the actual reducing agent. Consequently, the amount of metallic reducing agent used in the process of this invention may be varied from a catalytic amount to an amount sufficient to provide one electron for each hydroperoxy radical to be reduced to the keto group. Greater amounts of the metallic reducing agent may be used, if desired. Preferably, the amount of metallic reducing agent employed is at least such as to provide the electron necessary to reduce the hydroperoxide group to the keto group.

The solution of the metallic reducing agent is preferably added to the solution of the hydroperoxide at a slow rate in order to avoid the production of a highly colored product. While any temperature up to the thermal decomposition point of the alkyl hydroperoxydehydroabietate or slightly above may be used, there is no particular advantage to be realized in carrying out the reaction at an elevated temperature. The reaction is, therefore, normally carried out at about room temperature. However, lower temperatures may be used as, for example, 0° C. or even lower, if the solvent medium is such that it remains liquid at temperatures below 0° C. In general, a temperature of from about 0° C. to about 100° C., and preferably from about 10° C. to about 60° C., is used.

The esters of 9-oxodehydroabietic acid obtained by the above-described reduction reaction are most easily separated from the reaction mixture by pouring the latter into a large volume of water so as to dissolve the inorganic salts, and then extracting the organic product by means of ether or some other water-immiscible solvent. The product can then be separated from the extractant by distillation. This crude product frequently contains colored bodies which are not easily removed by crystallization. Removal of these colored bodies may usually be accomplished by distilling the crude product at reduced pressure or by chromatographing it as, for example, on an alumina column or with any other adsorbent which is effective for the separation of such colored bodies. By then recrystallizing the product from which such colored bodies have been removed, it is possible to obtain the esters of 9-oxodehydroabietic acid in pure form.

That the ketone produced in accordance with this invention is a dehydroabietic acid ester substituted by a keto group in the 9-position has been shown by the fact that an ultraviolet absorption spectrum of the product indicates that the carbonyl group is in the conjugate position with respect to the benzenoid nucleus. The keto group must then be on either the 9- or 14-carbon atom of the dehydroabietic acid nucleus. That it is not in the 14-position was shown by the fact that a negative idoform test was obtained with this product.

The esters of 9-oxodehydroabietic acid produced in accordance with this invention by the oxidation of dehydroabietic acid esters and subsequent reduction of the hydroperoxide so obtained are useful as intermediates in the synthesis of other derivatives of dehydroabietic acid and particularly as intermediates in the synthesis of pharmaceuticals.

What I claim and desire to protect by Letters Patent is:

1. The process of preparing an ester of 9-oxodehydroabietic acid which comprises oxidizing an ester of dehydroabietic acid in liquid phase with a gas containing free oxygen in the presence of a free radical oxidation initiator at a temperature of from about 60° C. to about 130° C. and contacting the oxidate containing the ester of 9-hydroperoxydehydroabietic acid which is so produced with a metallic reducing agent to form the said ketone.

2. The process of preparing an alkyl 9-oxodehydroabietate which comprises oxidizing an alkyl dehydroabietate in liquid phase with a gas containing free oxygen in the presence of a free radical oxidation initiator at a temperature of from about 60° C. to about 130° C. and contacting the oxidate containing the alkyl 9-hydroperoxydehydroabietate which is so obtained with a metallic reducing agent to form the said ketone.

3. The process of preparing methyl 9-oxodehydroabietate which comprises oxidizing methyl dehydroabietate in liquid phase with a gas containing free oxygen in the presence of a free radical oxidation initiator at a temperature of from about 60° C. to about 130° C. to produce an oxidate containing methyl 9-hydroperoxydehydroabietate and contacting said hydroperoxide with a metallic reducing agent to form the ketone.

4. The process of preparing ethyl 9-oxodehydroabietate which comprises oxidizing ethyl dehydroabietate in liquid phase with a gas containing free oxygen in the presence of a free radical oxidation initiator at a temperature of from about 60° C. to about 130° C. to produce an oxidate containing ethyl 9-hydroperoxydehydroabietate and contacting said hydroperoxide with a metallic reducing agent to form the ketone.

5. The process of preparing methyl 9-oxodehydroabietate which comprises oxidizing methyl dehydroabietate in liquid phase with a gas containing free oxygen in the presence of a free radical oxidation initiator at a temperature of from about 60° C. to about 130° C., separating the methyl 9-hydroperoxydehydroabietate in substantially pure form from the oxidate, and contacting the said hydroperoxide with a metallic reducing agent to form the ketone.

6. The process of preparing methyl 9-oxodehydroabietate which comprises oxidizing methyl dehydroabietate in liquid phase with a gas containing free oxygen in the presence of a peroxidic free radical oxidation initiator at a temperature of from about 60° C. to about 130° C., separating the methyl 9-hydroperoxydehydroabietate in substantially pure form from the oxidate, and reducing the said hydroperoxide by contacting a solution of the hydroperoxide in an inert solvent at a temperature of about 0° C. to about 100° C. with a metallic reducing agent to form the ketone.

7. The process of preparing methyl 9-oxodehydroabietate which comprises oxidizing methyl dehydroabietate in liquid phase with a gas containing free oxygen in the presence of a peroxidic free radical oxidation initiator at a temperature of from about 60° C. to about 130° C., separating the methyl 9-hydroperoxydehydroabietate in substantially pure form from the oxidate, and reducing the said hydroperoxide by adding a solution of ferrous sulfate in an aqueous solvent to a solution of the hydroperoxide in a water-miscible inert solvent to form the ketone.

8. The process of preparing an ester of 9-oxodehydroabietic acid which comprises contacting an ester of 9-hydroperoxydehydroabietic acid with a metallic reducing agent.

9. The process of preparing an alkyl 9-oxodehydroabietate which comprises reducing an alkyl 9-hydroperoxydehydroabietate with a metallic reducing agent.

10. The process of preparing methyl 9-oxodehydroabietate which comprises contacting methyl 9-hydroperoxydehydroabietate with a metallic reducing agent.

11. The process of preparing ethyl 9-oxodehydroabietate which comprises contacting ethyl 9-hydroperoxydehydroabietate with a metallic reducing agent.

12. The process of preparing methyl 9-oxodehydroabietate which comprises contacting methyl 9-hydroperoxydehydroabietate with a metallic reducing agent at a temperature of from 0° C. to about 100° C.

13. The process of preparing ethyl 9-oxodehydroabietate which comprises contacting ethyl 9-hydroperoxydehydroabietate with a metallic reducing agent at a temperature of from about 0° C. to about 100° C.

14. The process of claim 12 wherein the metallic reducing agent is ferrous sulfate.

15. The process of claim 13 wherein the metallic reducing agent is ferrous sulfate.

PAUL F. RITCHIE.

References Cited in the file of this patent

UNITED STATES PATENTS

| Number | Name | Date |
| --- | --- | --- |
| 2,434,643 | Drake | Jan. 20, 1948 |
| 2,435,831 | Harvey | Feb. 10, 1948 |

OTHER REFERENCES

Nystrom—Jr. Am. Chem. Soc.—vol. 69, May 1947, pp. 1197–1199.